US009331369B2

(12) United States Patent
Mizuno et al.

(10) Patent No.: US 9,331,369 B2
(45) Date of Patent: May 3, 2016

(54) RECHARGEABLE METAL NITRIC OXIDE GAS BATTERY

(71) Applicant: Toyota Motor Engineering & Manufacturing North America, Inc., Erlanger, KY (US)

(72) Inventors: Fuminori Mizuno, Ann Arbor, MI (US); Paul T. Fanson, Brighton, MI (US); Charles A. Roberts, Ann Arbor, MI (US); Nikhilendra Singh, Ypsilanti, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 173 days.

(21) Appl. No.: 14/150,168

(22) Filed: Jan. 8, 2014

(65) Prior Publication Data

US 2015/0194715 A1    Jul. 9, 2015

(51) Int. Cl.
*H01M 8/22*    (2006.01)
*H01M 4/13*    (2010.01)
*H01M 4/58*    (2010.01)
*H01M 6/16*    (2006.01)
*H01M 4/64*    (2006.01)
*H01M 4/66*    (2006.01)
*H01M 4/02*    (2006.01)
*H01M 4/36*    (2006.01)
*H01M 12/08*    (2006.01)
*H01M 8/06*    (2016.01)
*F01N 3/10*    (2006.01)
*F01N 3/08*    (2006.01)

(52) U.S. Cl.
CPC ............ *H01M 12/08* (2013.01); *F01N 3/0842* (2013.01); *F01N 3/10* (2013.01); *H01M 8/0606* (2013.01); *H01M 8/22* (2013.01)

(58) Field of Classification Search
USPC .............. 429/218.1, 402, 231.6, 231.95, 324, 429/336, 339, 341, 519, 523
IPC ................................... H01M 4/13,10/625, 4/58
See application file for complete search history.

(56) References Cited

U.S. PATENT DOCUMENTS

| 3,804,739 | A |   | 4/1974 | Bergeron |   |
|---|---|---|---|---|---|
| 3,979,225 | A | * | 9/1976 | Smith | H01M 8/18 429/410 |
| 4,321,313 | A |   | 3/1982 | Langer et al. |   |
| 4,390,602 | A | * | 6/1983 | Struthers | H01M 2/26 429/101 |

(Continued)

FOREIGN PATENT DOCUMENTS

| CN | 102208653 | 10/2011 |
| CN | 102371888 | 3/2012 |

(Continued)

OTHER PUBLICATIONS

International Search Report and Written Opinion issued Jun. 10, 2015 in PCT/IB 14/02809 filed on Sep. 29, 2014.

*Primary Examiner* — Patrick Ryan
*Assistant Examiner* — Julian Anthony
(74) *Attorney, Agent, or Firm* — Oblon, McClelland, Maier & Neustadt, L.L.P.

(57) ABSTRACT

A metal-nitric oxide electrochemical cell is provided. Also provided is a rechargeable battery containing the metal-nitric oxide electrochemical cell. A vehicle system wherein NO from a combustion engine exhaust is fed to a metal-nitric oxide battery is additionally provided.

17 Claims, 3 Drawing Sheets

11: Combustion engine
12: NO gas absorber
13: Metal-gas battery
14: Vacuum pump
15: Catalytic reactor

(56) References Cited

U.S. PATENT DOCUMENTS

| | | |
|---|---|---|
| 5,084,144 A | 1/1992 | Reddy et al. |
| 5,447,610 A | 9/1995 | Sharifian |
| 5,489,421 A | 2/1996 | Van Velzen |
| 5,976,721 A | 11/1999 | Limaye |
| 7,740,982 B2 | 6/2010 | Yoshizawa et al. |
| 2002/0160251 A1 | 10/2002 | Chang et al. |
| 2009/0004072 A1 | 1/2009 | Hamamoto et al. |
| 2009/0084085 A1 | 4/2009 | Kawai |
| 2010/0247981 A1 | 9/2010 | Huang |
| 2012/0094193 A1 | 4/2012 | Albertus et al. |
| 2012/0141889 A1 | 6/2012 | Lee et al. |
| 2013/0089810 A1 | 4/2013 | Hiraiwa et al. |
| 2013/0216924 A1 | 8/2013 | Hillhouse |

FOREIGN PATENT DOCUMENTS

| | | |
|---|---|---|
| JP | 2011-070835 | 4/2011 |
| KR | 20090026589 | 3/2009 |

\* cited by examiner

11: Combustion engine
12: NO gas absorber
13: Metal-gas battery
14: Vacuum pump
15: Catalytic reactor

RECHARGEABLE METAL NITRIC OXIDE GAS BATTERY

BACKGROUND OF THE INVENTION

The present invention is directed to a metal-gas battery, specifically a metal-gas battery with a cathode comprising nitric oxide (NO) as an active material.

Lithium ion batteries have been in commercial use since 1991 and have been conventionally used as power sources for portable electronic devices. The technology associated with the construction and composition of the lithium ion battery (LIB) has been the subject of investigation and improvement and has matured to an extent where a state of art LIB battery is reported to have up to 700 Wh/L of energy density. However, even the most advanced LIB technology is not considered to be viable as a power source capable to meet the demands for a commercial electric vehicle (EV) in the future. For example, for a 300 mile range EV to have a power train equivalent to current conventional internal combustion engine vehicles, an EV battery pack having an energy density of approximately 2000 Wh/L is required. As this energy density is close to the theoretical limit of a lithium ion active material, technologies which can offer battery systems of higher energy density are under investigation.

Metal-air batteries are one of the technologies under investigation as a potential advancement in energy technology to supplant and replace the lithium ion battery for several reasons. In a metal-air battery the positive electrode active material is oxygen gas which conceptually may be obtained from the air. As such, much of the mass of the battery associated with the cathode component is significantly reduced. Interest in metal-air batteries is also supported by the concept that $O_2$ gas is continuously coming from outside of the battery, and therefore, the battery performance in terms of capacity and lifetime would be determined by the metal anode. Theoretically, such a battery would function until the metal anode is consumed and as a result, the metal-air battery may have higher energy density potential than other battery technologies presently under investigation.

Due to the known energy potential of lithium, a $Li$—$O_2$ battery is of interest as a candidate high energy density type rechargeable battery. $Li$—$O_2$ batteries based on a source of purified $O_2$ have been demonstrated. However, when ambient air is employed as the oxygen source, the battery performance deteriorates and utility as a rechargeable battery is lost. This deterioration is believed to occur because the presence of $H_2O$ and $CO_2$ in air causes deactivation of lithium oxides such as $Li_2O_2$ and $Li_2O$, by formation of $Li_2CO_3$, which is an inactive material for recharging. Thus, a major challenge to the success of a $Li$—$O_2$ battery is the necessity for purification of $O_2$ gas from ambient air or atmosphere. Generally, a battery consuming pure oxygen would not be practicable for conventional consumer utility. However, with currently known technologies, the presence of $H_2O$ and $CO_2$ prevent successful development of a commercially useful battery.

One of the approaches to overcome this issue is removal of $H_2O$ and $CO_2$ through membrane technologies. Air management is necessary to implement the gas purification. However, the purification required seems to be quite difficult even using the state-of-art gas separation membrane technology. Further, it may be possible to eliminate $H_2O$ and $CO_2$ employing gas absorption, for example on a zeolite, however, such a gas absorption system would be too large to be considered a realistic solution in most battery applications.

In view of the problems associated with a metal-$O_2$ battery, effort is underway to develop alternative cathode systems for a metal-gas battery.

Albertus et al. (U.S. 2012/0094193) describes an electrochemical metal-gas cell having a lithium negative electrode and an oxygen/carbon dioxide active cathode material. The oxygen/carbon dioxide mixture is based on ambient air and includes $CO_2$. According to Albertus, a specific ratio of $CO_2$/$O_2$, 2:1 is necessary to achieve high energy density as a primary battery. However, except for the exhaust gas from a factory or other large stationary exhaust sources, it is difficult to concentrate the $CO_2$ gas to such ratio, because in ambient air, the quantity of $CO_2$ is approximately 0.03%. It may be possible to devise an air control system to meet this requirement in a fixed construction, although an air management system which maintains a constant $CO_2$ concentration is not conventionally available. However, for use in an automobile, such a battery would not be practical because the $CO_2$ concentration fluctuates and control to a specific ratio would be difficult.

Takechi et al. (JP 2011-070835) describes a metal air cell wherein the anode metal may be lithium, sodium, potassium, magnesium, calcium, aluminum or zinc. The oxidant supplied to the cathode is a combination of oxygen and carbon dioxide.

Hillhouse (U.S. 2013/0216924) describes a capacitor device for generating electrical power wherein a fuel is flowed over a working electrode of the capacitor, thus charging the capacitor. The flow is then reversed and an oxidant is flowed over the working electrode, thus generating current flow across the electrodes. Materials listed as fuels which can act as electron sources include hydrogen, carbon monoxide, NO, $NO_2$, $SO_2$ and volatile hydrocarbons.

Hiraiwa et al. (U.S. 2013/0089810) describes an electrochemical reaction apparatus for fluid flow decomposition of an ammonia containing stream, wherein the $NH_3$ is converted to $N_2$ and water when air or oxygen is coupled as an oxidant. Electric power may be generated due to a potential difference between the apparatus anode and cathode. The apparatus is in the form of a membrane electrode assembly (MEA) and functions as a fuel cell, not as a battery.

Lee et al. (U.S. 2012/0141889) describes a lithium air battery containing an organic electrolyte which includes a metal-ligand complex. The negative electrode contains lithium and the positive electrode contains oxygen from an external supply. The metal-ligand complex has a charge/discharge voltage range which falls within the range of a lithium battery and may transfer electrons via formation of redox couples during the charging and discharging cycles. Air or oxygen are the only cathode active materials disclosed.

Huang (U.S. 2010/0247981) describes a system for energy management of a composite battery (fuel cell). The system includes a series of modules for collecting off-gas from the fuel cell, analyzing the content of the off-gas and then directing the off-gas to a point of further fuel consumption. For example, where the off-gas contains hydrogen it may be consumed in an internal combustion engine or a hydrogen fuel cell.

Limaye (U.S. Pat. No. 5,976,721) describes a chemical cogeneration process which is conducted in a specially constructed monolithic mass having sets of passageways. A fuel such as hydrogen sulfide, ammonia or a hydrocarbon is introduced into one passageway, and an oxidant such as air, a nitrogen oxide, carbon dioxide, sulfur dioxide, sulfur trioxide or steam is introduced to a second passageway. The passageways are constructed of electrically conducting materials which are connected to an external electrical circuit.

Langer et al. (U.S. Pat. No. 4,321,313) describes the electrogenerative reduction of nitric oxide by reaction with hydrogen in the presence of electrocatalytic electrodes and electrolyte. As described the electrogenerative cell is an electrochemical reactor which is similar to a fuel cell.

Smith et al. (U.S. Pat. No. 3,979,225) describes a fuel cell based on a cathodic reduction of nitrogen dioxide ($NO_2$) to nitric oxide (NO). Then NO is captured and reoxidized to nitrogen dioxide for recycle back to the cathode of the fuel cell. Hydrogen gas or reformed hydrocarbon gas stream are disclosed as the anode reactant, however, any other anode half reaction may be coupled with the cathodic reduction.

Liang et al. (CN102371888) (Abstract only) describes a plasma generator which is effective to remove nitric oxide from an exhaust gas of a gasoline engine. Although the NO is passed between electrodes, utility as a battery is not disclosed.

Wen et al. (CN102208653) (Abstract only) describes a lithium air battery having an air electrode which contains a catalyst, a carrier and an adhesive.

Park (KR20090026589) describes fuel-cell based post processor to remove nitric oxides for an exhaust system of an engine.

Therefore, there is a need to find and develop alternative cathodic gases for a metal-gas battery which are safe, readily available and cost efficient.

SUMMARY OF THE INVENTION

This and other objects are addressed by the present invention, the first embodiment of which includes an electrochemical cell comprising: an anode comprising a metal; a porous cathode supplied with a gas comprising nitric oxide (NO); a separator located between the anode and cathode; and an electrolyte; wherein the NO is the active cathode ingredient.

In one specific embodiment of the present invention, the metal of the anode comprises one selected from the group consisting of lithium, sodium, potassium, magnesium, calcium, aluminum and zinc.

In a further embodiment, the anode metal is lithium.

The present invention further includes a rechargeable battery which contains the electrochemical cell of the previous embodiments.

In a further specialized embodiment the present invention includes a NO supply system which is attached to the battery and feeds NO to the cathode.

In another embodiment, the present invention includes a vehicle having the rechargeable battery and the NO supply system wherein the NO supply system obtains NO from the exhaust of the vehicle combustion engine.

The foregoing paragraphs have been provided by way of general introduction, and are not intended to limit the scope of the following claims. The presently preferred embodiments, together with further advantages, will be best understood by reference to the following detailed description taken in conjunction with the accompanying drawings.

DESCRIPTION OF THE PREFERRED EMBODIMENTS OF THE INVENTION

The present inventors are conducting a wide scale study and evaluation of materials which may function as cathode active materials for a metal-gas battery. The object of this study is to discover a cathode active gas to function in a metal-gas battery having high capacity and high working potential and does not have the problems described above for oxygen. The cathodic gas should be readily available, safe, easy to handle and obtain and cost efficient.

Throughout this description all ranges described include all values and sub-ranges therein, unless otherwise specified. Additionally, the indefinite article "a" or "an" carries the meaning of "one or more" throughout the description, unless otherwise specified.

According to the present invention the term "vehicle" means any power driven device designed for transportation including an automobile, truck van, bus, golf cart and other utility forms of transportation.

In the course of study and evaluation of potential gas cathodic materials, the present inventors have surprisingly discovered that nitric oxide (NO) can function as a cathode gas for a metal-gas electrochemical cell. The experiments described in the Examples indicate that NO gas possesses higher working voltage as well as higher reversibility (rechargeability) than $O_2$ gas. Moreover, the studies described also indicate that when NO is employed as the cathode gas, the charged and discharged states are kept on the cathode, thus showing redox performance. In addition, the working voltage as well as voltage hysteresis of the cell may be significantly improved by introducing NO gas into a metal-gas battery.

Figure 1:
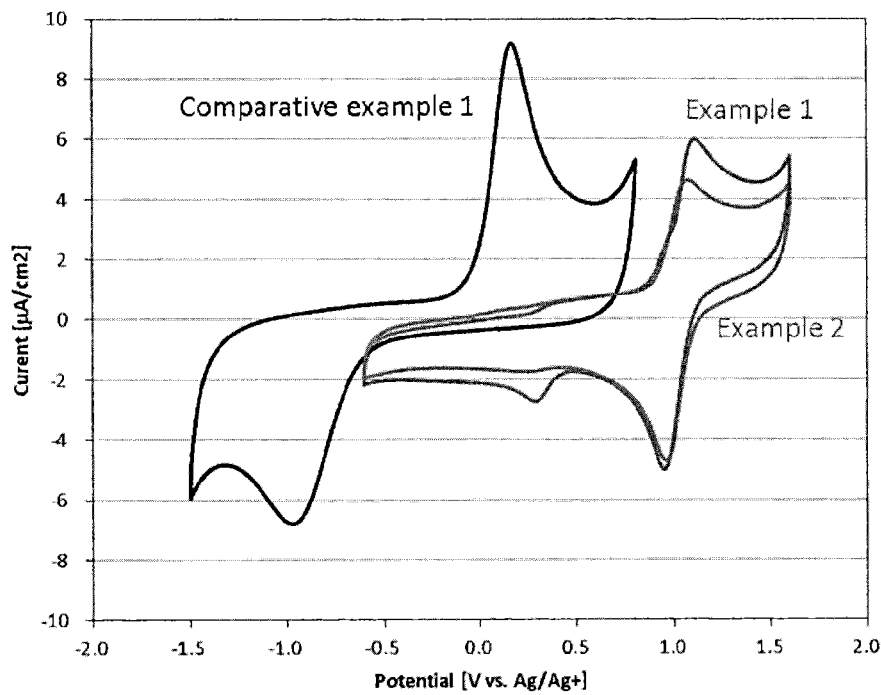
FIG. 1 shows a comparison of cyclic voltammograms obtained with a Li—$O_2$ cell and cells according to the present invention.

As shown in the Examples and FIG. 1, the inventors have determined that NO gas exhibits a redox reaction with narrow peak separation during oxidation/reduction. Compared with other gases, NO gas shows an improved rechargeability.

Regarding working voltage, NO also has a high operation voltage. Its working voltage is estimated at 4.2V vs. Li/Li+, which is extremely high when compared to that of the oxygen redox reaction (ORR) (2.2-2.7V), as also shown in FIG. 1.

Therefore, the first embodiment of the present invention is an electrochemical cell comprising: an anode comprising a metal; a porous cathode supplied with a gas comprising nitric oxide (NO); a separator located between the anode and cathode; and an electrolyte; wherein the NO is the active cathode ingredient.

In an embodiment of the present invention, the positive electrode may be a porous unit construction comprising an oxidation reduction catalyst, a conductive material and a binder. The cathode may be constructed by mixing the redox catalyst, conductive material and optionally the binder and applying the mixture to a current collector of appropriate shape. The oxidation reduction catalyst may be any material which promotes the NO redox reaction. The NO absorbing catalyst may contain as its active component any material which promotes NO absorbtion. Examples of a suitable catalyst active component include but are not limited to an alkali or alkali earth metal in the form of its oxide ($Li_2O$, $Na_2O$, $K_2O$, MgO, CaO, SrO, BaO), hydroxide (LiOH, NaOH, KOH, $Mg(OH)_2$, $Ca(OH)_2$, $Sr(OH)_2$, $Ba(OH)_2$), carbonate ($Li_2CO_3$, $Na_2CO_3$, $K_2CO_3$, $MgCO_3$, $CaCO_3$, $SrCO_3$, $BaCO_3$), or any combination thereof. The active component is typically impregnated on a high surface area oxide support such as $Al_2O_3$, $ZrO_2$, $TiO_2$, $CeO_2$, or any mixed oxide thereof. The rate of NO absorption may be increased by the addition of a precious metal such as Pt, Pd, Rh, or any combination thereof.

The positive electrode may contain an electrically-conductive material which is chemically stable in the potential window of use of the cell. Preferably the conductive material is porous and has a large specific surface area to provide high output. An example of such material may include but is not limited to a carbonaceous material such as Ketjen black, acetylene black, vapor grown carbon fiber, graphene, natural graphite, artificial graphite and activated carbon. Other suitable conductive materials may be conductive fibers, such as a metal fiber, metal powder, such as nickel and aluminum, and organic conductive materials, such as a polyphenylene derivative. In some embodiments mixtures of these materials may be employed. Other suitable conductive materials may be conductive ceramics such as titanium nitride and titanium carbide.

Suitable binders known to one of ordinary skill which are chemically stable in the potential window of use of the cell may include thermoplastics and thermosetting resins. For example, polyethylene, polypropylene, polytetrafluoroethylene (PTFE), Polyvinylidene fluoride (PVDF), styrene butadiene rubber, a tetrafluoroethylene hexafluoro ethylenic copolymer, a tetrafluoroethylene hexafluoropropylene copolymer (FEP), a tetrafluoroethylene perfluoroalkyl vinyl ether copolymer (PFA), ethylene-tetrafluoroethylene copolymer (ETFE resin), polychlorotrifluoroethylene resin (PCTFE), a propylene-tetrafluoroethylene copolymer, an ethylene-chlorotrifluoroethylene copolymer (ECTFE) and an ethylene-acrylic acid copolymer. These binders may be used independently, or mixtures may be used.

The components may be wet blended in the presence of a suitable solvent or dry blended using a mortar or other conventionally known mixing equipment. The mixture may then be applied to a charge collector by conventionally known methods. Any suitable charge collector may be employed. Preferred charge collectors may be any of carbon, stainless steel, nickel, aluminum and copper. In order to assist diffusion of the NO, it may be preferable that the collector is a porous body, such as mesh. In certain embodiments the charge collector may comprise a protective coating of an oxidation-resistant metal or alloy to protect the collector from oxidation.

In one specific embodiment of the present invention, the metal of the negative electrode comprises one selected from the group consisting of lithium, sodium, potassium, magnesium, calcium, aluminum and zinc and in a specific embodiment the metal of the negative electrode is one of lithium and magnesium.

The electrolyte ion conducting medium which is interposed between the positive electrode and the anode may comprise as an electrolyte, one or more of $LiPF_6$, $LiClO_4$, $LiAsF_6$, $LiBF_4$, $Li(CF_3SO_2)_2N$, $Li(CF_3SO_3)$ and $LiN(C_2F_5SO_2)_2$. A nonaqueous solvent is preferred and may be selected from organic solvents including cyclic carbonates, chain carbonates, cyclic esters, cyclic ethers and chain ethers. Examples of a cyclic carbonate include ethylene carbonate, propylene carbonate, butylene carbonate and vinylene carbonate. Examples of a chain carbonate includes dimethyl carbonate, diethyl carbonate and methylethyl carbonate. Examples of a cyclic ester carbonate include gamma butyrolactone and gamma valerolactone. Examples of a cyclic ether include tetrahydrofuran and 2-methyltetrahydrofuran. Examples of a chain ether include dimethoxyethane and ethyleneglycol dimethyl ether. In some preferred embodiments the solvent may be a nitrile system solvent such as acetonitrile or an ionic liquid. Ionic liquids comprises any of cations such as imidazolium cation, piperidinium cation, pyrrolidinium cation and ammonium cation and any of anions such as bis(trifluorometahnsulfonyl)imide anion, bis(fluorosulfonyl)imide anion, tetrafluoroborate anion and hexafluorophosphate anion. In one preferred embodiment the solvent is an ionic liquid such as N-methyl-N-propylpiperidinium bis(trifluoromethylsulfonyl)imide (PP13TFSI).

Figure 3:
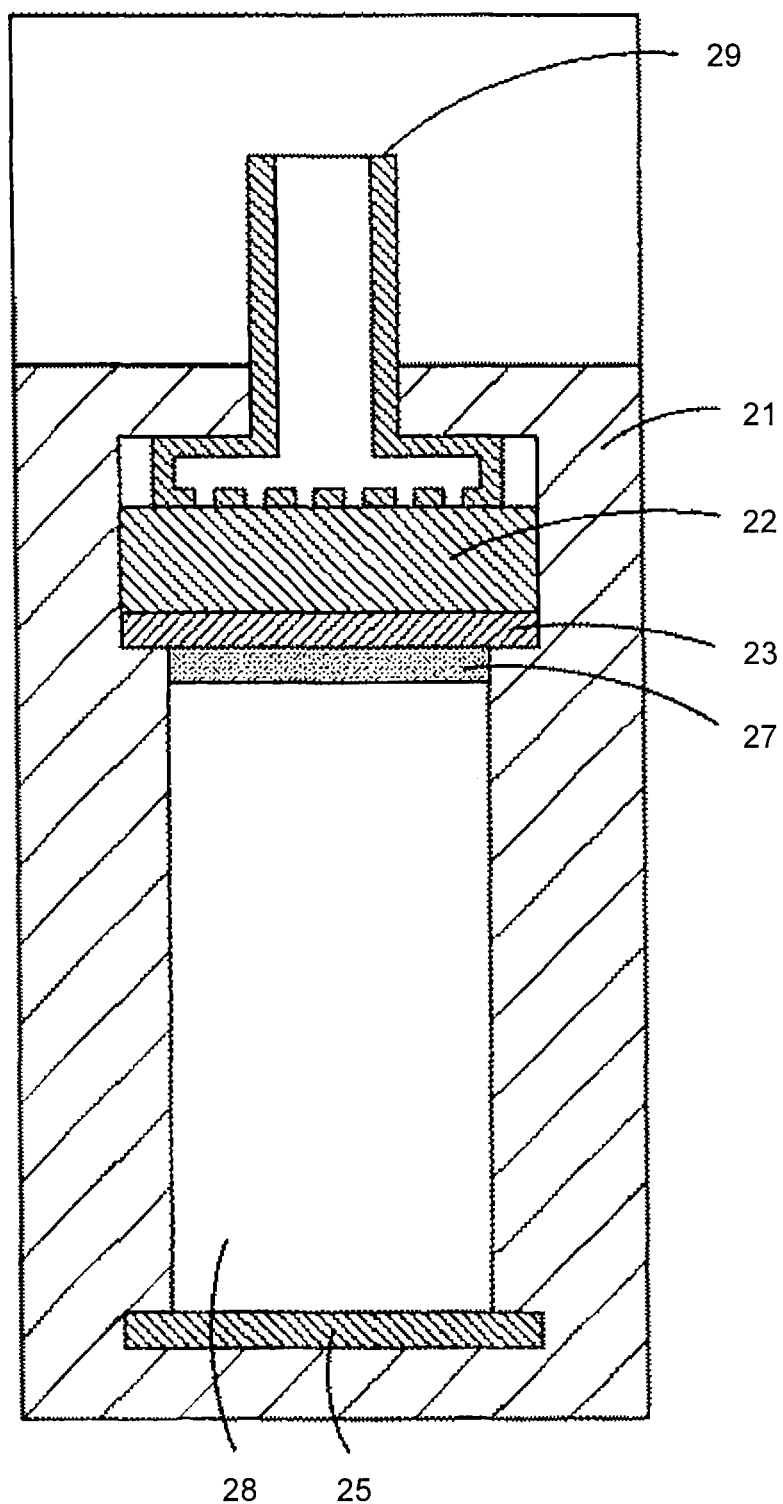
FIG. 3 shows a schematic diagram of a NO electrochemical cell according to one embodiment of the present invention.

An example of an electrochemical cell according to the present invention is shown in FIG. 3. The negative electrode 25 is placed in a casing 21 and the positive electrode is placed to oppose the negative electrode 25 via separator 27. The electrolyte 28 is between the positive electrode 23 and the negative electrode 25. A porous board 22 is on the positive electrode 23, and NO supply inlet 29 is in communication with the positive electrode across the porous board.

The present invention further provides a rechargeable battery comprising the metal-NO electrochemical cell.

As NOx gases are components of the exhaust of combustion engines, this discovery may have significant environmental and energy ramifications because as shown in FIG. 3, a system wherein NO is obtained from the exhaust gas of the combustion engine and fed to a metal-NO battery may be constructed. Such system would eliminate at least NO from the exhaust and convert it to electrical energy.

Figure 4:
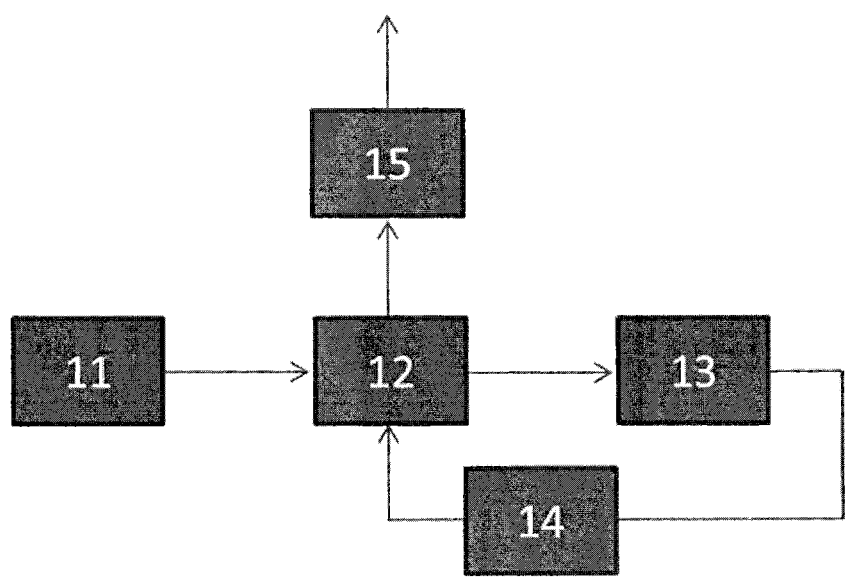
FIG. 4 shows a schematic diagram of a battery system for a vehicle according to an embodiment of the present invention.

Thus in a further embodiment, the present invention provides a rechargeable battery equipped with a NO gas feed and in a special embodiment the gas feed is a component of a system wherein the NO is obtained from the exhaust of a combustion engine. One example of such a system is schematically shown in FIG. 4 where the NO gas is collected from the gas mainstream out of the combustion engine by using, for example, a NO gas absorber. Next, the collected NO gas is released from the absorber into a battery where electrical energy is produced. After cycling, the NO gas used for the battery reaction may be released from the battery and then new NO gas from the absorber introduced into the battery. Release from the battery may be accomplished by vacuum draw or other conventional methods. The released gas may be mixed with fresh exhaust and directed to a catalytic reactor for conventional treatment before vented to the environment. Of course, as indicated in FIG. 4, the normal flow of the engine exhaust may be conducted from 11 through 12 to 15. In other embodiments, the NO fed to the metal-NO battery may be enriched within the feed system. In order to protect the battery, the NO feed may be cooled before entry into the battery. The feed of the NO may be either continuous or of intermittent flow.

Having generally described this invention, a further understanding can be obtained by reference to certain specific examples which are provided herein for purposes of illustration only and are not intended to be limiting unless otherwise specified.

EXAMPLES

Test cells containing working, counter and reference electrodes were constructed to compare $O_2$ and NO as cathodic active materials.

The test gas was obtained from respective high grade gas cylinders. The working, counter and reference electrodes were glassy carbon as rod, Pt wire and Ag wire in the acetonitrile solution containing tetrabutyl ammonium perchlorate (TBAP) and AgNO$_3$ as supporting salt, respectively. The scan rate was 50 mV/sec and the operation temperature was room temperature.

FIG. 1 shows the cyclic voltammograms in the N-methyl-N-propylpiperidinium bis(trifluoromethansulfonyl)imide (PP13TFSI) based electrolyte solutions;

Comparative Example 1 under pure O$_2$ gas in the 0.2 mol/kg PP13TFSI-LiTFSI solution

Example 1 under NO/Ar/He mixed gas (1%/1%/98% in vol) in the 0.2 mol/kg PP13TFSI-LiTFSI solution Example 2 under NO/Ar/He mixed gas (1%/1%/98% in vol) in the 0.1 mol/kg PP13TFSI-Mg(TFSI)2 solution As can be seen, a cathodic peak due to O2 reduction was observed at around −1.0V vs. Ag/Ag+, while the peaks attributed to NO+ reduction were observed at 1.0V vs. Ag/Ag+. Furthermore, a large peak separation (1.2V) between reduction and oxidation was observed under O$_2$ atmosphere, while a small separation was observed under NO atmosphere. This result indicates that NO gas possesses higher working voltage as well as higher reversibility (rechargeability) than O$_2$ gas.

Figure 2:
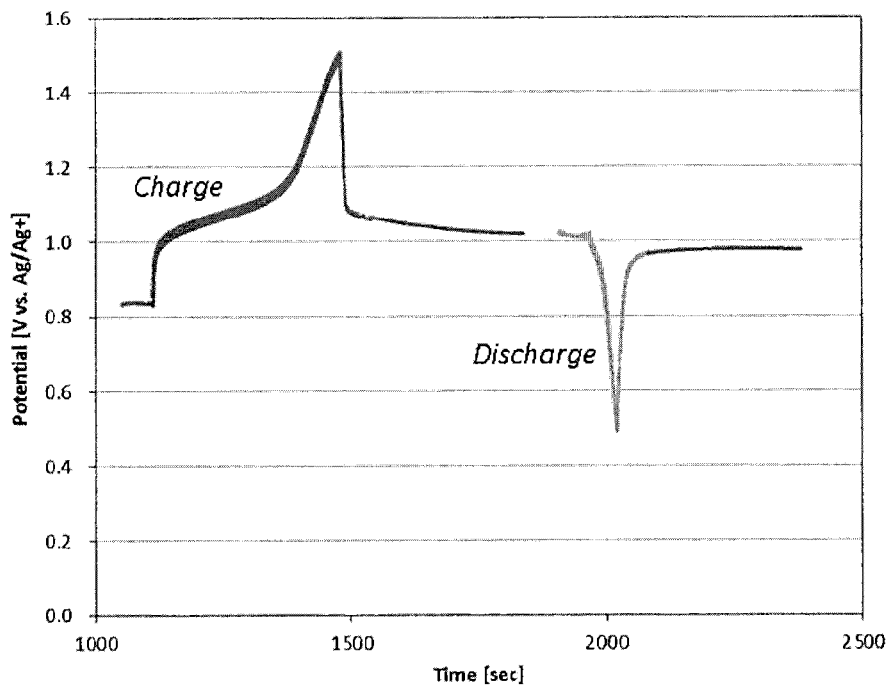
FIG. 2 shows the charge-discharge profiles of NO gas in the 0.2 mol/kg PP13TFSI-LiTFSI solution.

A cell of the same construction described above having NO gas as cathodic material and 0.2 mol/kg PP13TFSI-LiTFSI solution as electrolyte was maintained at a current density of 700 nA/cm$^2$ and the charge-discharge profiles measured as shown in FIG. 2. The charge and discharge plateaus were observed at around 1.05V and 0.95V, respectively. Also, when the cell was held at open circuit potential, the flat potential after charging and discharging was observed slightly above 1.0V and below 1.0V, respectively. Thus, the charged and discharged states were maintained on the cathode and provided evidence of a NO redox reaction. The working voltage as well as voltage hysteresis was significantly improved by introducing NO gas into a metal-gas battery.

Numerous modifications and variations on the present invention are possible in light of the above description and examples. It is therefore to be understood that within the scope of the following Claims, the invention may be practiced otherwise than as specifically described herein. Any such embodiments are intended to be within the scope of the present invention.

The invention claimed is:

1. A metal gas battery, comprising:
an anode comprising a metal as an active anodic ingredient;
a porous cathode in contact with a gas comprising nitric oxide (NO) such that the NO is an active cathodic ingredient;
a separator located between the anode and cathode; and
a nonaqueous electrolyte;
wherein the battery is rechargeable.

2. The metal gas battery according to claim 1 wherein the metal of the anode comprises one selected from the group consisting of lithium, sodium, potassium, magnesium, calcium, aluminum and zinc.

3. The metal gas battery according to claim 2, wherein the metal comprises lithium.

4. The metal gas battery according to claim 2, wherein the metal comprises magnesium.

5. The metal gas battery according to claim 1, wherein the cathode comprises a porous charge collector and the porous charge collector is coated with a mixture of an oxidation reduction catalyst, a conductive material and a binder.

6. The metal gas battery according to claim 5, wherein the oxidation reduction catalyst is capable of absorption of NO.

7. The metal gas battery according to claim 5, wherein the oxidation reduction catalyst comprises at least one of an alkali metal oxide, alkaline earth metal oxide, an alkali metal carbonate and an alkaline earth metal carbonate.

8. The metal gas battery according to claim 5, wherein the oxidation reduction catalyst is impregnated on at least one support selected from the group consisting of Al$_2$O$_3$, ZrO$_2$, TiO$_2$ and CeO$_2$.

9. The metal gas battery according to claim 5, wherein the oxidation reduction catalyst further comprises at least one precious metal selected from the group consisting of Pt, Pd and Rh.

10. The metal gas battery according to claim 5, wherein the oxidation reduction catalyst further comprises a porous electrically-conductive material.

11. The metal gas battery according to claim 10, wherein the porous electrically-conductive material comprises at least one selected from the group consisting of Ketjen black, acetylene black, vapor grown carbon fiber, graphene, natural graphite, artificial graphite, activated carbon, a conductive metal fiber, a metal powder, an organic conductive material and a conductive ceramic.

12. The metal gas battery according to claim 1, wherein the battery comprises a gas inlet for introduction of a gas feed comprising NO.

13. A vehicle comprising:
an internal combustion engine having an exhaust comprising NO;
a battery according to claim 8; and
a NO absorber attached to an exhaust system of the engine;
wherein the NO absorber is in communication with the gas inlet of the battery and NO from the exhaust is supplied to the battery through the gas inlet.

14. The vehicle according to claim 13, wherein the anode of the battery comprises lithium.

15. The vehicle according to claim 13, wherein the anode of the battery comprises magnesium.

16. The vehicle according to claim 13, wherein NO gas released from the battery is returned to the absorber.

17. The metal gas battery according to claim 1, wherein the nonaqueous electrolyte comprises at least one solvent selected from the group consisting of a cyclic carbonate, a chain carbonate, a cyclic ester, a cyclic ether, a chain ether, a nitrile and an ionic liquid.

* * * * *